Jan. 24, 1961  G. T. RANDOL  2,968,962
TORQUE-ACTUATED BRAKE BOOSTER FOR MOTOR VEHICLES
Filed March 2, 1959  4 Sheets-Sheet 4

Inventor

United States Patent Office 2,968,962
Patented Jan. 24, 1961

2,968,962
TORQUE-ACTUATED BRAKE BOOSTER FOR MOTOR VEHICLES
Glenn T. Randol, 2nd and Paul Sts., Box 275, Mountain Lake Park, Md.
Filed Mar. 2, 1959, Ser. No. 796,412
19 Claims. (Cl. 74—89)

My invention relates to torque-transmitting mechanisms, and more particularly to a friction-type two-directional drive which derives torque from a rotating element associated with motor vehicles and the like to actuate in part the brake system thereof, said drive providing for physical operating force to supplement the torque force on said rotating element.

A primary object of my invention is to provide new and novel mechanical-power booster brake mechanism for automotive vehicles and the like which is controllable by an operator-operated member, to actuate, for example, the master cylinder of a hydraulic brake system to apply and release the wheel brakes under influence in part of drive-torque derived from a rotating element such as, for example, the fan and/or generator belt drive commonly employed on a vehicle power plant.

In the art of power brake mechanisms, workers in the art have resorted to use of vacuum generated within the intake-manifold of an internal-combustion engine or a pump driven from the engine, compressed air produced by a pump driven from the engine and/or drive line, and hydraulic pressure produced by an engine and/or drive line driven pump, to create the necessary operating pressures to actuate the brake system on motor vehicles under control of a brake-pedal located in the driver's compartment of the vehicle.

The principal disadvantages to the use of such differential pressures aforesaid involve the problem of effectively sealing the movable parts to prevent loss of power or brake fluid or both, and the limitations set on the line pressure which such mechanisms can develop for a given overall size of the unit dicated by the limited installation space available on the motor vehicle best illustrated by present-day vacuum booster units installed in the engine compartment on the firewall for control by a suspended-pedal assembly. A further objection to use of pressure differential operated motors is their higher cost resulting from a number of somewhat delicate parts and the after installation maintenance of frequent renewal of certain components such as the flexible diaphragm, piston leathers or flexible bellows depending on the type of power member employed in the motor, and the control valve parts which require close tolerances to prevent power loss and/or loss of sensitivity in controlling the motor along with the difficulty of providing proper lubrication for such moving parts to prolong their service life.

It is, therefore, an important object of my invention to overcome the above noted disadvantages by providing a novel engine-driven clutch-type torque transmission which is simple in construction, compact and works at all times in a bath of lubricant to insure long service life. Such transmission being mounted on the vehicle firewall for control by conventional suspended-pedal linkage, and adapted to actuate the hydraulic brake master cylinder preferably forming an integral part of the transmission.

In a more specific sense my invention utilizes for the first time a slipping friction clutch device comprising an apply clutch and a release clutch controllable by foot pressure on the brake-pedal, to provide a follow-up action of control between said pedal and slipping engaging action of said clutches to apply the vehicle brakes and to release them, said device having a screw rotated by said clutches, which threads through a complemental fixed block to impart sliding movement to the master cylinder piston, and a torsional spring for assisting the release clutch to retract the screw to enable the master cylinder piston to withdraw under influence of its return spring disposed in the pressure working chamber of said cylinder, and which controls the usual residual pressure check-valve associated with the discharge port.

An object importantly related to the object next above is the provision of an actuatable element which is releasably connected by yieldable detent means to an element which controls the two clutches aforesaid, whereby when drive torque is not effective as when the engine is stopped, the operator may by increasing pressure on the brake-pedal operate the actuatable element independently of the clutch device to accomplish a "straight-through" operation of the master cylinder in conventional fashion to apply and release the brakes without any of the clutch device operating parts interfering with such operator operation of the brakes. In this way, when the engine is stopped and the vehicle is on a grade of should the engine stop as at a traffic light, particularly with the vehicle transmission in neutral, the operator has full control of the brakes but with greater effort required by merely pressing through on the pedal to engage the actuatable element with the piston in the master cylinder.

The aforesaid detent means are of novel construction since maximum pressure that can be applied on the apply clutch by the operator is predeterminedly established thereby to prevent lock-up, thus, retaining the selected clutch in slipping engaged condition while the actuatable element is brought into engagement with the master cylinder piston to provide physical assist to the torque force being transmitted by the apply clutch.

The release and apply clutches in the clutch device are preferably of the wedge engaging type comprising complemental circular taper-sided ridges or embossments on confronting faces of the driven and driving members, and which work in oil. The driving members and the driven member, the latter being connected to the screw, are preferably made of different materials for high frictional coefficiency therebetween, such as, for example, the driving members are made of steel while the common driven member is made of brass frictional surface or vice versa.

Drive to the clutch device is provided by a shaft having universal joints at each end, one of said joints being connected to a drive shaft in the clutch device for the apply clutch, and the other joint being connected to a pulley on a rotating shaft driven from the engine fan belt such as from the commutator end of the generator or a separate shaft for this purpose. A drive shaft parallel to the first-mentioned drive shaft for the apply clutch is driven by a pair of constantly meshing gears fixed on said drive shafts, and the release clutch receives drive from the last-mentioned drive shaft in an opposite direction. Drive between said drive shafts to the apply and release clutches is provided by a pair of constantly meshing gears which slide in unison through the full sliding stroke of said clutches.

Another object of my invention utilizes the said yieldable detent mechanism to control the degree of pressure which the operator may exert on both the apply and release clutches in response to depressing and releasing respectively the brake-pedal, the releasing pressure on the release clutch being a factor of the brake-pedal return spring, while the apply pressure being determined by the force exerted on the pedal by the operator. The brake-pedal return spring acts directly through a clutch shifting member to engage the release clutch which determines the degree of slipping engagement of this clutch, as determined by the relative strengths of the detent connection and the pedal return spring. This detent connection thus serves to prevent any possible lock-up of either clutch in the clutch device where the operator force is excessive to the degree of clutch engagement to effect the desired line pressure to stop or slow the vehicle as may be the case.

With these and other objects and advantages in view, the invention consists of the new and novel combination, construction and arrangement of parts as hereinafter more fully described, set forth in the claims appended hereto, and disclosed in the accompanying drawings forming a part hereof, wherein:

Figure 1 is a schematically depicted plan view of my torque-responsive brake booster mechanism constructed in accordance with the present invention, and exemplarily shown connected diagrammatically to be driven from the fan belt of an internal-combustion engine to operate the master cylinder of a hydraulic brake system conventionally employed on automotive vehicles and the like;

Figure 4 is a transverse sectional view taken along the line 4—4 of Figure 2 showing details of one of the two identical clutch release springs and closely related parts;

Figure 7 is a perspective depiction of one of the two identical clutch release springs;

Like characters of reference designate like parts in the several views.

General assembly

This invention has a particular use and value in connection with motor vehicles and the like equipped with various types of known master cylinders for energizing the hydraulic brake system. It is further particularly adapted to such vehicles wherein such master cylinders are mounted in the engine compartment on the body firewall for operation by a suspended-pedal linkage mounted on the opposite side of the firewall in the driver's compartment.

It will be understood from the description to follow that the cycle of operation and various features of the mechanism are clearly adaptable to other assemblies than the foregoing. This cycle relates to the establishment of a brake "off" condition, a brake "on" condition and a brake "on" holding condition in response to releasing, depressing and halting respectively of the pedal under control of the operator. The cycle also includes a "straight-through" operation of the master cylinder by the operator in cooperation with torque-assist or independently thereof to effect the three above operating conditions of the vehicle brakes.

In the illustrated embodiment of my invention, the drive torque is preferably derived from the associated engine and transmitted via its fan belt 5 to a V-grooved pulley 6 secured to a power takeoff shaft 7 journaled on a bracket 8 mounted on the engine block. This arrangement provides a simple and inexpensive means of transmitting engine torque to the mechanism of the present invention. However, this power takeoff may be accomplished from the commutator end of the generator armature shaft thereby dispensing with the above separate pulley and drive shaft and special supporting bracket therefor. Broadly, the invention contemplates use of any rotating part of the power plant and associated drive line for actuating the mechanism of the present invention.

Figures 1, 4, 7:
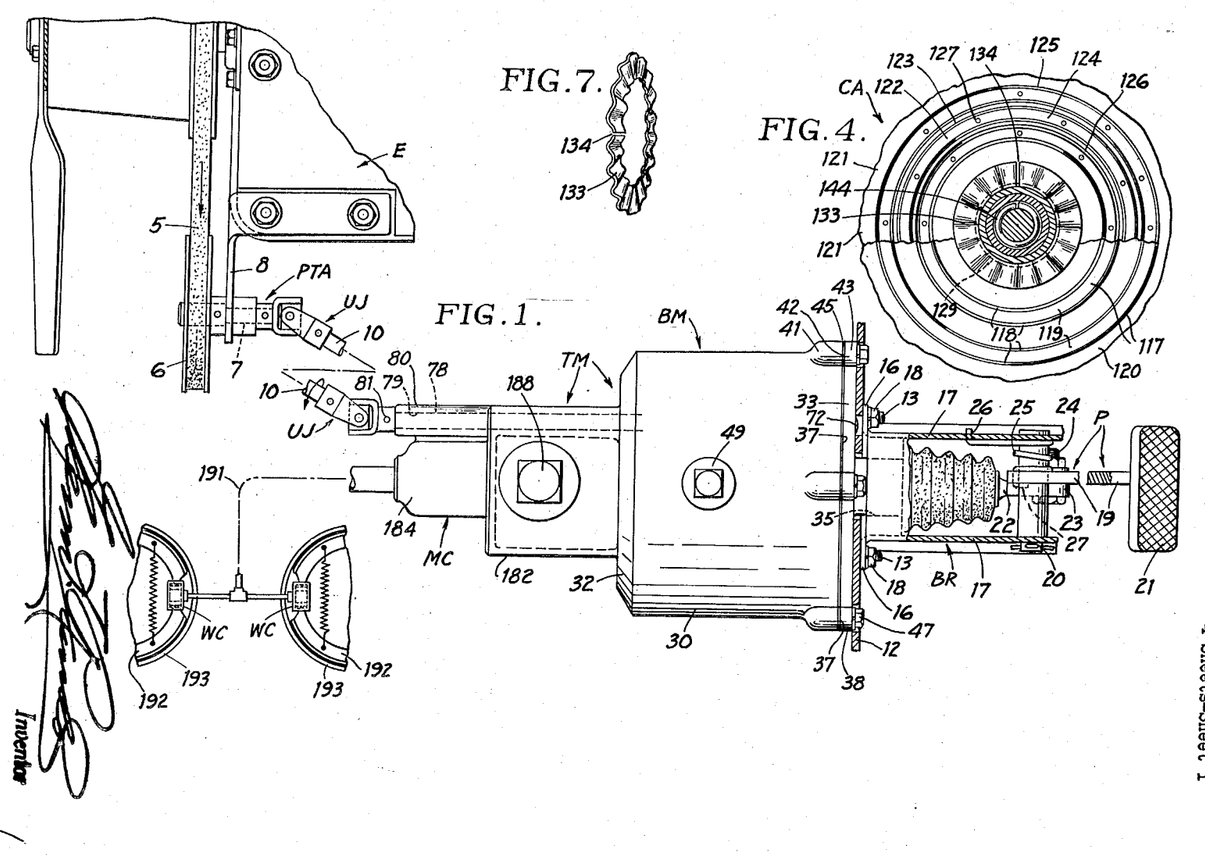

In Figure 1, wherein the invention is exemplarily applied to a conventional automotive vehicle, there is a fragmentary portion of an internal-combustion engine block E, a power takeoff assembly PTA mounted on the block for rotation by said fan belt, torque-transmitting means or mechanism TM indicated by its housing, a conventional brake master cylinder MC indicated by its housing integral with the housing of the torque-transmitting mechanism, wheel cylinders WC for actuating the vehicle brakes, and a suspended-pedal assembly P mounted on the operator's side of the vehicle firewall for controlling the torque-transmitting mechanism which is mounted on the engine side of said firewall. The drive line of the power takeoff includes a pair of universal joints UJ interconnected by a drive shaft 10 corotatable with an input shaft 11 rotatably mounted on the housing of said torque-transmitting mechanism.

My improved torque-responsive booster mechanism is generally designated as a whole BM and comprises: the aforesaid torque-transmitting mechanism TM herein disclosed as a two-directional friction transmission or device, the hydraulic master cylinder MC of conventional construction and operation in operative association with said device, and the conventional suspended pedal assembly P controlled by the operator.

The suspended-pedal assembly

The pedal assembly P shown in Figure 1 includes a bracket BR of inverted U-shaped cross section rigidly mounted on the operator's side of the firewall 12 as by threaded studs 13 projecting from the end of said booster mechanism BM through registering holes 14, 15 in the firewall and lateral outturned end flanges 16 respectively terminating side segments 17 of said bracket. Nuts 18 tightly threaded on the studs attached the booster mechanism BM and pedal assembly P in a unitary assembly on opopsite sides of the firewall in operating positions best demonstrated in Figure 1. A pedal 19 is pivotally suspended from its upper end on the bracket BR by a cross shaft 20, said pedal terminating at its lower end with a foot pad 21. A push-rod 22 is pivotally connected at one end 23 as by a shouldered bolt or stud 24, or otherwise, to the pedal for transmitting pedal movement to an element of the torque-actuated device TM as will appear. A normally preloaded torsional-type spring 25 is shown, for example, encircling the pivot shaft 20 with one end anchored to the bracket BR at 26 and the other end 27 reacting on the pedal to bias the latter and connected parts to their respective normally released positions best shown in Figures 1 and 2.

The torque-actuated booster device

Reference to Figures 1, 2, 3, 4 and 5 shows the new and novel torque-actuated booster device TM which comprises: a generally cylindrical hollow housing or casing 30 open at one end 31 and closed at the other as by an integrated wall 32, the open end is detachably closed as by a cover plate 33 which carries the aforesaid mounting studs 13. A rearwardly projecting hub 35 integral with said cover plate is provided with a longitudinal bore 36 therethrough. A circular finished face 37 defines the inner peripheral marginal portion of said cover and which is offset at 38 rearwardly from the normal inner side 39 of said cover. A plurality of elongated hollow bosses 41 circumferentially equally spaced, are formed externally on the housing 30, said bosses being internally threaded and each terminating flush with a circular finished face 42 which defines the open end of said housing. A corresponding number of longitudinal embossments or ears 43 are formed on the periphery of the cover plate 33, complemental to said bosses and having holes 44 registering with said threaded holes. A gasket 45 is disposed between the finished faces 37, 42 for effecting an oil-tight seal therebetween when the cover plate 33 is attached to said housing as by cap bolts 47 inserted through the holes 44 into tightly threaded engagement with the threaded bosses 41 (see Figure 2). Medially disposed through the top wall portion of the housing 30 is a threaded opening 48 closed by a filler plug 49 provided with a vent 50, said opening serving to enable replenishment of lubricating oil carried within the housing to lubricate the moving parts therein, and at the forward bottom portion of said cylindrical housing is another threaded opening 51 therethrough closed by a plug 52 which serves as a drain for the lubricating oil.

The aforesaid input shaft 11 is journaled on the end wall 32 by a sleeve bearing 55, and the opposite end of said shaft is journaled on the cover plate 33 by a sleeve bearing 56 whereby said shaft is mounted for rotation within the housing 30 between its end wall and cover. A countershaft 58 is disposed in parallel spaced relation to said input shaft and is similarly journaled between the end wall 32 and cover plate 33 by sleeve bearings 59, 60 respectively supporting opposite ends thereof for rotation within said housing. A gear train generally designated GT serves to rotate said shafts 11, 58 through a pair of constantly meshing gears 61, 62 respectively which are co-rotatable with said shafts and mounted on enlarged diameter terminating portions 63, 64 respectively between a finished thrust pad 65 on the wall 32, and a circular flange 66 integral with said shafts, said flanges defining the inner ends of said enlarged portions thereof. Preferably the enlarged portions of said shafts are each provided with a pair of oppositely disposed flats 67 which receive complemental openings 68 through said drive gears, said openings having corresponding flats 69 to lock the gears to the shafts whereby said gears are mounted to rotate with said shafts and thus impart opposite rotative movements thereto. The aforesaid shafts are preferably of square cross-section terminating in reduced diameter cylindrical portions 70, 71 which are supported by said bearings 56, 60 respectively in the cover plate 33. A pressfitted cap 72 provides an oil-tight closure for the bearing holes each of which terminates in a circular recessed shoulder 73 in which the periphery of said cap is tightly impinged. Mergence of the cross-sectioned portion of said shafts with their respective reduced diameter portions forms a shoulder at 75 on each of them, which engages finished thrust pads 76 encircling the inner ends of the bearing holes to thus limit axial thrust of said shafts in cooperation with the drive gears aforesaid abutting their respective thrust pads. The forward end of said input shaft 11 terminates in an elongated cylindrical portion 78 extending from the enlarged portion 63 through a bearing bore 79 formed in a boss 80 integral with the exterior of the master cylinder body and end wall 32, to the forward exterior end of the booster mechanism BM as best demonstrated in Figures 1 and 2. One of the universal joints UJ is connected as by pinning at 81 or otherwise, to the exposed end of said cylindrical portion 78 for co-rotation therewith.

Slidably mounted for co-rotation on each of the square sectioned portions of the shafts 11 and 58 in longitudinal spaced relation is a driving gear 85 of identical construction and size. Each of these gears is provided with a circular retaining plate 86 on opposite sides thereof and made rigid therewith as by rivets 87 or otherwise. The diameter of these spaced plates is substantially equal to an imaginary circle defining the major diameter of the gear to provide a channel 88 corresponding to the width and working depth of the space between the teeth for an important purpose as will appear. The retaining plates on the right sides of the gears 85 normally abut the forward ends of a long and a short spacer (stop) sleeve 89 and 89' respectively, and which are mounted on the counter and input shafts 58, 11 respectively with their opposite ends engaging the thrust pad 76 to establish the gears in their normal fully released or retracted positions shown in Figure 2.

The previously mentioned hub 35 on the cover plate 33 has an extension 90 projecting from the inner side of the cover 33 and terminating in a finished end surface 91. Coaxially disposed with respect to the hub extension 90 is a confronting hub 93 integral with the inside of the end wall 32. This latter hub encircles the open end of a cylindrical bore 94 projecting into the body of the master cylinder MC which will be referred to hereinafter. Diametrically disposed slots 95 of predetermined depth are formed in the end of the hub 93 wall as clearly depicted in Figures 5 and 6. An internally threaded collar 97 having outwardly projecting diametrically disposed lugs or ears 98 is disposed in the open end of said hub with the lugs circularly aligned and engaging their respective slots 95 whereby relative rotation of the collar with respect to the hub 93 is prevented. Adjacent the end of the hub 93 is an internal annular groove 101 spaced from the bottom of the slots 95 equal to the width of the collar 97, said groove being engaged by a split expansible retainer ring 102 to maintain the collar 97 axially stabilized and thus prevent its displacement from the slots 95.

Slidably supported in the longitudinal bore 36 is a sleeve member 104 having a forward or inner reduced diameter portion 105 which defines with a normal diameter portion 106 and an external annular shoulder 107 normally disposed in circular alignment with the finished end of the hub extension 90. Adjacent said shoulder on the reduced diameter portion 105 is an externally threaded portion 108 to be later referred to. Coaxially disposed with respect to the threaded collar 97 and sleeve member 104 is a pressure- or thrust-transmitting tubular member generally designated PM, said member having the function of performing work, and therefore, may be termed an "output member" for flexibility of terminology. This tubular member comprises a rear smooth diameter portion 109 and a forward externally threaded extension 110 preferably provided with square threads. The portion 109 is counterbored at 111 to telescopically receive the reduced diameter portion 105 of the sleeve member 104, and the forward threaded extension 110 is supported in threaded engagement with the threaded collar 97 whereby rotation of the tubular member PM in opposite directions reciprocates (retracts and advances) said member relatively with respect to the collar 97 as a function of the threading coaction therebetween.

Figures 6, 8, 9:
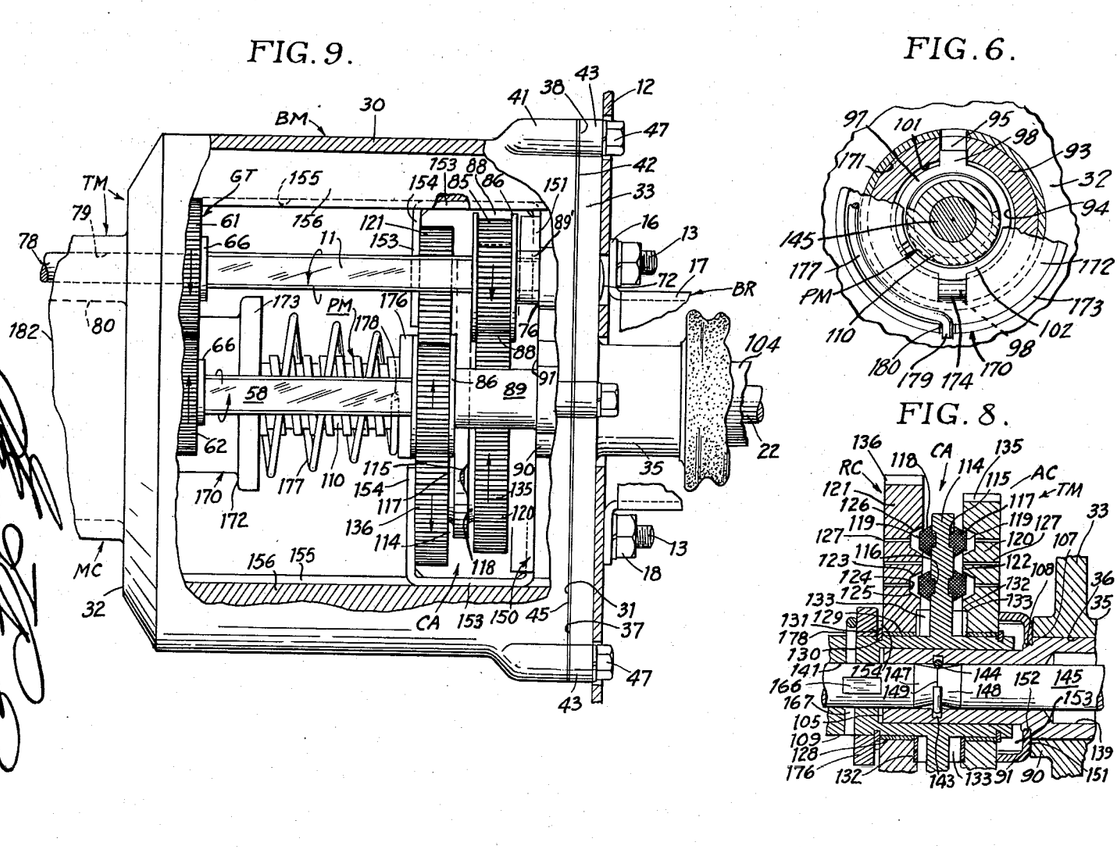
Figure 6 is a transverse sectional view taken along the line 6—6 of Figure 2, and showing on an enlarged scale details of the worm drive and stationary seat for the axial-torsional clutch release spring.
Figure 8 is a fragmentary sectional view on an enlarged scale of Figure 2 showing details of the two-way clutch drive mechanism in idling disengaged condition wherein the vehicle brakes are "off"
Figure 9 is a plan view on an enlarged scale of the torque-actuated device illustrated in Figure 1 with portions of the housing broken away to expose the operating parts therein.

The friction clutch assembly depicted in Figure 8 on an enlarged scale, is designated as a whole CA and comprises: a circular driven member 114 integral with and medially outstanding from the portion 109 of the tubular member PM for imparting rotative movement to said tubular member. This driven member is preferably provided on its opposite sides with a pair of radially spaced concentric circular channels 115, 116. Bonded into each of these channels as by soldering or otherwise, is a ring-type friction element 117 having outstanding converging working faces 118 terminating at their crest in a flat surface 119 normal to the axis of said member. Disposed on the apply side of the driven member 114 is a complemental driving member 120, and another driving member 121, preferably of larger diameter than member 120, is disposed on the opposite or forward side of the driven member. Each of these driving members is juxtaposed with respect to the friction elements on the driven member in overlapping relation with respect to a circular friction ridge 122 having complemental converging working faces 123 terminating at their crest in a flat surface 124, said ridge being flanked on both sides by spaced diverging working shoulders 125 and 126 whereby the pairs of friction elements aforesaid project into the spaces between the confronting working faces on each of the driving members normally slightly spaced apart when disengaged. The spaces between said friction elements and those flanking the ridge 122 are of greater depth than the height of said elements and ridges to enable the complemental working faces and shoulders to engage in slipping relation to selectively transmit torque from the driving members to the driven member to impart rotational and consequent axial movements to the threaded pressure member PM. A plurality of relief ports 127 are radially disposed from the axis of the mechanism in the driving members to relieve oil accumulating between the crests and bottoms of the spaces of said overlapping friction elements between said driving members and the driven member so that frictional engagement of said member will not be inhibited. The bonded elements are preferably made separate from the driven member proper to enable use of metals which would provide the required slipping frictional coefficient of torque transferal thereby and at the same time a longer service life, such as polished bronze or brass for the bonded elements and polished steel for the driving member ridges. Since these parts work in oil, frictional engagement therebetween would not tend to overheat the engaging clutch members which must under all conditions have a slipping relation to prevent lock-up which, if the latter occurred, would take control of the brakes from the operator with possible hazardous consequences.

Circular apertures 128 are provided through the central portions of each of the driving members, said apertures being fitted with pressfitted sleeve bearing 129 for rotatably supporting these driving members on the smooth diameter portion 109 of the tubular member PM adjacent the driven member. An external annular groove 130 is provided in the portion 109 spaced from the driven member on opposite sides thereof equal to the width of the driving member plus disengaging space therefor with respect to the driven member. A split contractible retainer ring 131 engages each of these grooves to stabilize the driving members in their relative working relation with respect to the driven member. Normally each of the driving members is slightly spaced out of engagement with the driven member as best demonstrated in Figure 2 wherein the vehicle brakes are "off" or fully released, and the driving members are "freewheeling" or idling if the engine is running. A circular recess 132 is provided on the ridged side in each of the driving members and which circles their apertures 128. Operably disposed in each of these recesses is a circular wave-type spring 133 split at 134 (see Figure 7) and installed under a preloaded condition to react against their respective driving and driven members to separate them thus tending at all times to disengage the clutches which will hereinafter be referred to as the apply clutch AC and the release clutch RC. The periphery of each of the driving members is formed with gear teeth 135, 136 each of which engage one of the gears 85 mounted on the shafts 11, 58 respectively. The engaging teeth on the driving members and driving gears aforesaid are maintained in circularly engaged relation irrespective of their axial disposition when imparting rotational and axial movements to the threaded pressure member PM, by said retaining plates 86 which at all times confine the meshing teeth on the driving members within the channel 88 on the driving gears 85 to thus maintain each driving member engaged with its driving gear irrespective of the axial disposition of the driving member best demonstrated in Figures 2 and 3.

The sleeve member 104 is provided with a longitudinal bore 138 through its forward end portion which merges with a counterbore 139 extending to the outer end of said sleeve member. Coaxially disposed with respect to said bores in the sleeve member and of the same diameter as the longitudinal bore 138, is a longitudinal bore 141 coextensive with the threaded extension 110 of the tubular pressure member PM and connecting with the inner end of said counterbore 111 to provide an internal annular shoulder 142. An internal annular channel 143 is provided in the surface of the bore 138 normally in circular alignment with the radial center of the driven member. This channel receives a split contractible metallic ring 144 preferably of circular cross section. Operably projecting through the bores 138, 139 and 141 is an actuating element herein disclosed as a plunger or cylindrical rod 145 which is provided with an external camming groove 146 of V-shaped contour defining angular diverging working surfaces 147, 148 joined by a common apex 149 which is normally in circular alignment with said split ring 144 under predetermined tension thereon best demonstrated in Figures 2 and 8. The channel 143, ring 144 and groove 146 form what may be termed a "releasable detent mechanism, device or connection" generally designated DC which is operably incorporated between the actuating rod 145 and sleeve member 104 to perform an important function as will later become apparent.

Figures 2, 3, 5:
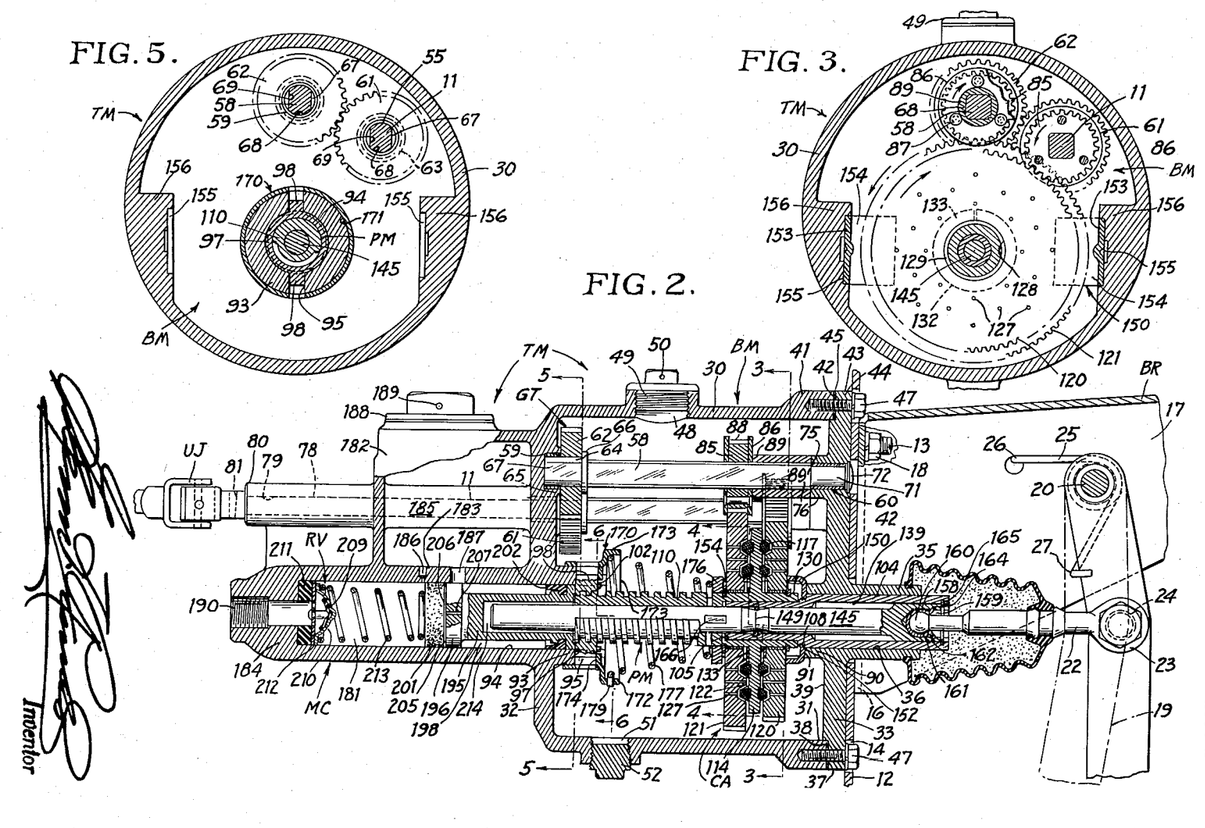
Figure 2 is a longitudinal section on an enlarged scale of the booster mechanism per se illustrated in Figure 1, wherein the parts are in their relative released positions.
Figure 3 is a transverse sectional view taken along the line 3—3 of Figure 2 showing particulars of the apply clutch, associated shifting mechanism and drive therefor.
Figure 5 is a transverse sectional view taken along the line 5—5 of Figure 2 showing the gearing which interconnects the two drive shafts and particulars of the worm drive and associated axial-torsional clutch release spring.

A shifting member or bracket 150 is best disclosed in Figures 2 and 9 for the clutch driving members 120, 121 to selectively engage them with the common driven clutch member 114. This shifting member is preferably of rectangular configuration formed with a side segment 151 having a centrally disposed circular threaded aperture 152 through which the reduced diameter portion 105 of the sleeve member 104 projects with the threads 108 engaged with the aperture threads to place the outer face of the said member in alignment with the shoulder 107 for movement together, said shifting member engaging the inner end 91 of the hub extension 90 to act as a stop to establish the operating parts of the torque-actuated device TM in their normally released positions shown in Figure 2. The side segment 151 lies juxtaposed with respect to the smooth outer face of the apply clutch AC driving member, and continues at right angles at opposite ends therefrom to form end segments 153 which terminate in inturned legs or flanges 154 parallel to the side segment with their ends spaced in confronting relation. The end segments are slidably guided longitudinally in flat bottom grooves 155 formed in inwardly projecting elongated bosses 156 integral with the housing 30, said bosses and grooves terminating flush with the finished face 42. The flanged ends of the shifting member lie juxtaposed with respect to the smooth outer side of the release clutch RC driving member whereby reciprocable movement of the shifting member imparts corresponding movements to the driving members 120, 121 to selectively engage the common driven member 114, such engaging movements of the driving members being opposed by their release springs 133. Accordingly, leftward shifting movement of the shifting member 150 from its normal position shown in Figure 2 engages the apply clutch AC, and rightward shifting movement of the shifting member from any shifted position engages the release clutch RC, to selectively drive the threaded tubular pressure member relatively to the threaded collar 97.

The outer end of the actuating rod 145 terminates in an outwardly projecting collar or flange 158 and is slidably supported in the counterbore 139 of the sleeve member 104. This flange is formed with a blind internal bore 159 which receives the free ball end 160 of the push-rod 22. This ball end is connected with said flange by a loop-type leaf spring 161 having its ends 162 embedded in an internal annular groove 163 formed adjacent the open end of said bore whereby the pushrod 22 and actuating rod 145 move in unison axially with a universal rotational movement of the push-rod provided by the ball end with respect to said rod. An internal annular groove 164 is provided adjacent the outer open end of the counterbore 139 to receive a split expansible retainer ring 165 to establish the normally released position of the actuating rod 145 with respect to the sleeve member 104.

A flat 166 is formed on the cylindrical surface of the actuating rod 145 in circular alignment with said internal shoulder 142 formed at the mergence of the bore 141 through the tubular member PM and said counterbore 111, the latter bore telescopically receiving the reduced diameter portion 105 of the sleeve member 104. This flat is of sufficient length as to maintain atmospheric communication between the end of the reduced diameter portion 105 and shoulder 142 to prevent compression therebetween, said flat venting the space between the shoulder and sleeve end to atmosphere via one of two diametrically opposed holes 167 through the wall of the tubular member, and thence through vent 50 in the filler cap 49.

Figure 11:
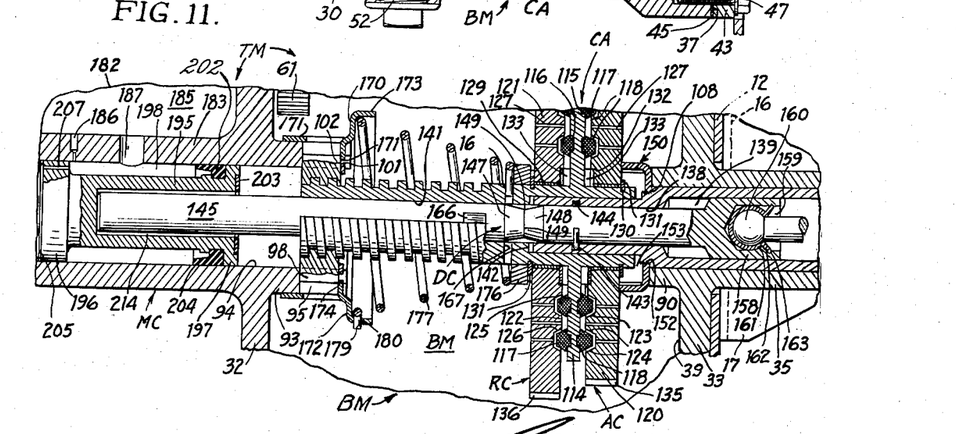
Figure 11 is a fragmentary sectional view taken from Figure 2 to show the relative operated disposition of the parts corresponding to pedal-actuation of the master cylinder to apply the brakes when the engine is stopped.

It is important now to observe that the function of the detent mechanism DC is to transmit to the shifting member 150 sufficient pressure exerted on the pedal 19 by the operator to place the driving clutch member 120 in slipping engagement with the driven member 114. Pressures exerted on the pedal above that are required to establish such slipping engagement bypasses the driving member 120 in response to releasing expansion of the split detent ring 144 to accommodate relative movement of the actuating rod 145 with respect to the sleeve member 104. It is thus seen that this detent mechanism serves the important function of preventing a lock-up of the clutch AC by controlling the amount of physical force that can be applied to effect application of the vehicle brakes. This detent mechanism also serves to release the actuating rod 145 for a "straight-through" operation of the master cylinder MC when the engine is not operating to produce torque-assist best demonstrated in Figure 11.

A circular ring-type member or spring seat 170 provided with a central opening 171 is mounted on the hub 93 in operating position, the rear end of said opening terminating in an outturned flange 172 having a circular segment 173 normal thereto. Extruded from the wall portion of said opening are two diametrically disposed confronting legs 174 in circular alignment which project into the slots 95 of the hub 93 to prevent rotational movement of the seat member relative to said hub.

A thrust collar 176 loosely encircles the smooth surface portion 109 of the tubular pressure member PM in continuous engagement with the marginal confronting portion of the opening through the driving member 121 of the release clutch RC, said collar being disposed to the right of the aforesaid holes 167 through the wall of said tubular pressure member.

A helically formed conical spring 177 is operably disposed between the flange 172 of said spring seat 170 and the above thrust collar 176 in encircling relation with respect to the threaded extension 110 of the tubular member PM. The smaller end of this spring reacts against the thrust collar 176 with the end 178 of the last coil outturned into the free hole 167, and the other larger end of this spring reacts against the spring seat 170 with the end 179 of the last coil thereof outturned through a hole 180 in the circular segment 173 of said spring seat. The convolutions of this spring enable them to assume a telescopic relation substantially in circular alignment at the maximum compressed condition wherein the full stroke of the pressure transmitting member PM would be effective in a brake-applying direction. The end 178 of the smaller end of this spring projects into the free hole 167 whereby this spring opposes both rotational and axial movements of the pressure-transmitting member PM induced by its threaded co-action with the fixed collar 97. Thus, when the apply clutch AC is engaged to drive the threaded extension 110 of the tubular member PM further through the threaded collar 97 to apply the brakes, spring 177 is acted on torsionally and thrustwise to reduce the diameter of each convolution and at the same time to bring the convolutions into closer parallel or circular alignment wherein the spring would be nested substantially within the spring seat 170, but upon disengagement of the apply clutch AC in response to removing foot pressure therefrom, this spring would unwind and axially extend simultaneously to assist to release clutch RC in rotating the driven member 114 in the opposite direction and thereby urge the movable clutch assembly CA comprising the clutches AC and RC toward their normally released positions shown in Figure 2. Accordingly, were the brakes applied with the clutch AC engaged and the engine should stop to nullify the torque input to the driving members 120, 121, then this spring would act to rotate the driven member 114 and thus reset the clutch assemly CA out of interference with a "straight-through" operation of the master cylinder MC by the foot pedal as is understood. This spring release action of the torque-actuated device TM is accommodated by the disengaged condition of the driving members induced by action of the spring 177 on the driven member 114 and release of pressure on the pedal 19 so that the disengaging springs 133 can separate the driving members from the driven member. Thus, if the brakes are "on" induced by slipping engagement of the apply clutch AC, and the engine stops, the spring 177 acts directly on the driven member 114 in the same direction of rotation to release the brakes "off" independently of the idle releasing driving member upon the disengaging springs 133 being released to accommodate free rotation of the driven member 114.

*The brake master cylinder*

The master cylinder MC is of conventional construction and operation and therefore, will only be described briefly to insure a clear understanding of its operative relationship to the torque-actuated booster device TM. The aforesaid hydraulic cylinder or bore 94 has the usual variable pressure-working chamber 181 and a gravity-type fluid supply 182 therefor separated by a cylindrical wall 183 which, as noted hereinbefore, is open at its inner end, and closed at its outer end by a wall 184, the closed end of the cylinder serving as the fixed end of said working chamber 181. The cylindrical wall 183 is integral with a substantially rectangular superimposed hollow compartment 185 which serves as the aforesaid fluid supply or reservoir, the cylinder and compartment forming the master cylinder body MC which preferably projects forwardly from the end wall 32 as an integral assembly with the housing 30 to form said housing for the torque-actuated booster mechanism BM. The cylindrical wall 183 includes a compensating or bypass port 186 and an intake port 187 therethrough for controlling fluid communication between the reservoir and pressure-working chamber 181 and the interior of the cylinder 94 disposed rearwardly of said chamber. Additional fluid may be introduced into the reservoir through the removable filler cap 188 provided with a vent passageway 189 to prevent overflow due to fluid-surge tending to compress the air above the fluid. The pressure-working chamber 181 serves to pressurize the brake fluid therein and displace it through a discharge port 190 which extends through the end wall 184 into the hydraulic lines 191 to the wheel cylinders WC to actuate the brake shoes 192 into frictional engagement with their respective brake drums 193 rotatable with the vehicle wheels, such pressure being developed jointly by the force exerted by the apply clutch AC in slipping engagement and the force exerted by the operator on the pedal mechanism P, or by either of the aforesaid operating forces acting independently of each other as would be the case, for example, were the engine stopped, to apply the brakes by a "straight-through" operation of the master cylinder by pedal force alone.

Reciprocably mounted in the cylinder 94 is a conventional spool-type piston 195 which will be referred to in certain of the claims as a hydraulic plunger, fluid-displacing member, or in a broader patent sense as "fluid-displacing means" which include all the elements associated with the piston 195 in the master cylinder MC. In this way flexibility in terminology is provided to enable appropriate language in accordance with the definition of the invention set forth in the claims. The piston 195 has the usual longitudinally spaced head and bearing lands 196, 197 respectively with the ring-like fluid chamber 198 therebetween, the latter having uninterrupted communication with the intake port 187 leading to the reservoir 182. The variable pressure-working chamber 181 is disposed between the inner face of the end wall 184 and the head land 196, the latter being equipped with a cup-shaped pliant seal 201 on its end face. The bearing land 197 is fitted with a ring-like pliant seal 202, and an embedded hardened metal thrust ring 203 in its outer side opposite its seal, to receive thrust from the end of the threaded extension 110 impelled by the driven member 114, whereby the piston 195 is reciprocated in unison with the threaded extension when the driven member 114 is being acted on by the driving members of the clutches AC and RC. Each of the seals aforesaid carry a horizontal outer circular lip 204 normal to the vertical walls thereof. When the piston 195 is in its fully released position shown in Figure 2, the edge of the lip on the seal 201 is disposed to the immediate right of the compensating port 186 to enable exchange of fluid between the reservoir and working chamber 181 to compensate for excessive or insufficient fluid in said working chamber following release of the brakes as is well understood. Operably disposed between the back or vertical wall of the seal 201 and face of the head land is a conventional star-shaped leaf spring 205, the extremities of its legs 206 are positioned to overlie the confronting ends of passageways 207 through the wall of the head land 196 in communication with the fluid chamber 198 whereby fluid pressure reacting on the seal urges the legs to tightly seal the ends of said passageways from the pressure-working chamber 181 during a brake application, and upon release of the brakes, during which a temporary vacuum may be created within the working chamber 181 as a result of rapid return of the piston 195 toward released position, the spring legs are released to accommodate flexing to open said passageways and thus enable fluid from the reservoir via the chamber 198 to be drawn past the lip of the head land seal into the working chamber 181 to maintain the hydraulic brake system filled irrespective of the mode of reciprocating the piston 195. When the piston 195 is released best demonstrated in Figure 2, the compensating port 186 lies ahead of the edge of the lip of the seal 201 in close adjacency thereto, to enable such excess or lack of fluid in the working chamber 181 to adjust to or from the reservoir as the case may be so that a minimum pressure (non-activating) condition obtains. These minimum pressure conditions are established by the well known residual pressure check-valve RV which includes a one-way pressure discharge valve DV, the latter having a flexible element 209 which admits displaced fluid to pass into the brake lines via ports 210 in the valve RV. A removable ring-type valve seat 211, preferably made of pliant material, encircles the discharge port 190 in intimate contact with the finished surface on the working chamber end wall 184. An annular outstanding flange 212 is provided on the residual valve, and a normally preloaded helical spring 213 of preferably conical configuration reacts at its larger end against said flange to seat it on said seat 211, and the other smaller end reacts on the head land seal to urge the piston 195 toward its normally released position which is defined by the fully retracted disposition of the driven member 114 shown in Figure 2. A blind longitudinal bore 214 is provided in the piston 195 and terminates flush with the outer end thereof. This bore receives the free end of the actuating rod 145, said rod end being predeterminately spaced normally from the bottom of said bore to provide the operating movement of said actuating rod relatively to the clutches AC and RC, to shift the shifting member 150 thereby causing selective engagement of said clutches to apply and release the brakes. It is important to note that when maximum torque transmission is effected by the apply clutch AC to apply the vehicle brakes, that the aforesaid detent mechanism DC is operable to release the actuating rod 145 in response to increasing pressure on the pedal 19 while still maintaining the apply clutch engaged, to bring the free end of said rod into engagement with the bottom of the bore 214 whereby operator assistance is provided to produce the required line pressure in conjunction with the activated torque-actuated device TM. It is further to be noted in connection with the operational behavior of the actuating rod 145 that in the event the engine is not running to supply the drive torque to the device TM, the detent mechanism DC is operable to release the rod for actuation by the foot pedal 19 for a "straight-through" operation of the master cylinder piston 195 to apply and release the brakes without interference from the idled torque-actuated device TM, best demonstrated in Figure 11. In this way, the operator is at all times assured of full braking control of the vehicle whether or not the engine is running, but without engine torque assistance, force exerted on the pedal necessary for a given brake application is considerably greater as is understood.

*Operation*

The operation of my improved torque-actuated brake booster BM will be apparent from the foregoing description but may be summarized as follows to insure a clear understanding of the operating cycles:

Assuming the torque-responsive booster BM is installed on a motor vehicle as the present disclosure exemplarily demonstrates in Figure 1, to operate the hydraulic brake system commonly employed on such vehicles, is in released brake "off" condition as depicted in Figures 1 and 2. With the engine E running, the clutch assembly CA comprising the apply and release clutches AC and RC respectively are rotating in opposite directions out of engagement under influence of their respective disengaging springs 133 with respect to the common driven member 114, relatively to each other and to said driven member as shown in Figures 2 and 8. From the driver's viewpoint, the apply clutch driving member 120 is rotating in a clockwise direction indicated by the arrow applied to this part on Figure 9 and the release clutch driving member 121 is rotating in a counterclockwise direction as indicated by the arrow applied to this part in this figure. Thus, the clutch assembly CA imparts a two-directional rotation to the threaded extension 110 to advance and retract it relatively to the internally threaded collar 97 to reciprocate the master cylinder piston 195. The threads on the extension are square and the thread lead may be varied to obtain the desired axial movement for a given full rotation of said extension. A further consideration must be borne in mind to clearly understand the operational behavior of the present apparatus, which is, that the clutch assembly CA cannot assume a "lock-up" condition, the clutches AC and RC must at all times, while engaged, have a slipping relation with the driven member 114. Accordingly, power-run-out of torque assistance is defined by the frictional coefficient obtaining between the driving members and driven member to effect a brake application sufficient to stop the vehicle for a given operating condition of the vehicle.

In the normally released positions of the operating parts comprising the torque-actuated device TM as portrayed in Figures 1 and 2, the compensating port 186 in the master cylinder MC is open to accommodate static atmospheric condition of the brake fluid in the reservoir and working chamber 181, while the fluid in the brake lines and wheel cylinders is under a minimum non-activating pressure of, for example, from 8–12 p.s.i. established by the closed condition of the residual pressure check-valve RC.

Initial depression of the pedal 19 corresponding to the dashed line position thereof shown in Figure 2, moves the actuating rod 145 to the left carrying with it the shifting bracket 150 in engagement with the outer face of the driving member 120 of the apply clutch AC to engage this clutch in opposition to its disengaging spring 133 to produce a slipping torque-transmitting condition with respect to the driven member 114 thereby imparting clockwise rotation thereto and the connected threaded extension 110 to impel the latter forwardly (leftward) as a consequence of its threaded coaction with the collar 97, which moves the master cylinder piston 195 in a corresponding direction to reduce the working chamber 181 thereby pressurizing the brake fluid therein and displacing it through the discharge check-valve DC and port 190 into the brake lines 191 to operate the wheel cylinders WC to expand the brake shoes 192 into frictional engagement with their brake drums 193 to apply the brakes. Initial movement of the driven member 114 to the left as viewed in Figure 2 closes the compensating port 186 which operation conditions the master cylinder MC to pressurize the brake fluid for the purpose.

The aforesaid simultaneous movement of the shifting bracket 150 to engage the apply clutch AC is brought about through the yieldable detent connection DC operably incorporated between the actuating rod 145 and sleeve member 104, the normal diameter of the latter being slidably supported in the hub bore 36, and its forward reduced diameter 105 being telescopically projected into the counterbore 111 to support the right end of the pressure-transmitting member PM. The locking effect produced by the detent mechanism DC is of such magnitude as to limit the thrust-transmitting capacity of the driven member 114 in relation to the pressure exerted on the pedal 19. That is to say, the detent mechanism DC acts as an inhibitor to prevent co-rotation between the clutch driving and driven members irrespective of the amount of pressure exerted by the operator on the pedal 19. At maximum torque transferal of either the apply or release clutch in slipping engagement defined by the normal operating disposition of the detent mechanism DC, the latter becomes effective to release the actuating rod 145 from the sleeve member 104 and thereby establishes the point of torque transferal run-out. This sustained slipping frictional engagement between the selected clutch AC and RC is provided by the split resilient ring 144 riding the selected angular surface 147 or 148 respectively. These two angular surfaces merge with the normal diameter of the actuating rod 145 and each is of such length as to enable limited relative movement of the rod 145 with respect to the sleeve member 104 without taking up the space (see Figure 2) normally obtaining between the free end of the rod and bottom of the bore 214 in the master cylinder piston 195. However, should additional braking pressure be required over that being produced by the slipping engagement of the apply clutch AC, increased pressure on the pedal 19 would force the split ring 144 radially outwardly into its channel 143 by the camming action of the angular shoulder 147 to receive the normal diameter of the actuating rod 145, and in such case the free end of the actuating rod would engage the bottom of the master cylinder piston bore 214 to assist the torque-applying action of the clutch AC, or in case of partial or complete ineffectiveness of the torque-actuated device TM, the brakes could be applied directly through force exerted on the pedal 19 which is termed a "straight-through" operation of the master cylinder MC. Even though the split detent ring 144 would be no longer in engagement with the cam surfaces 147 or 148, the clamping action of the ring 144 about the normal diameter of the actuating rod would still serve to transmit thrust force from the shifting bracket 150 against the apply clutch AC to maintain it in slipping engagement with the driven member 114 but at less torque-transferring efficiency than when the ring is engaged in the V-groove 146 along the taper surfaces aforesaid where maximum torque-transferal is effective at the mergence of the outer ends of the tapered surfaces with the normal diameter of said actuating rod.

It is thus seen that the detent mechanism DC acts as a safety device to control the degree of pressure which can be applied through the pedal 19 to either of the driving members of the clutches AC or RC to prevent lock-up between said clutches, which, if such should occur would take control of the brake-applying operation away from the driver with resultant hazardous consequences.

As the driven member 114 and fluid-displacing parts move leftward together to close the compensating port 186 under influence of operator effort on the pedal 19 transmitted through the push-rod 22, actuating rod 145, detent connection DC and shifting bracket 150, a progressive reaction transferal is effective on the pedal simulating a "follow-up" control between the pedal 19 and clutches AC and RC whereby incremental movements of the pedal in a brake-applying direction produce corresponding axial movements of the threaded extension 110 and hydraulic piston 195. Pedal "feel" of the amount of braking force in effect is provided by the clutch disengaging springs 133 depending on which clutch is activated, reaction of force on pedal to activate clutch AC and tension build-up of the pedal return spring 25. If the pedal is halted at any brake applied position thereof, the apply clutch AC instantly disengages sufficiently to maintain the status quo of the brakes in cooperation with the lead of the threads on the extension 110 reacting on the threads of the fixed collar 97.

During such halted status of the brake pedal to hold the vehicle brakes "on," it should be importantly noted that the apply clutch driving member 120 slightly advances the threaded extension 110 relatively thereto to reduce the degree of torque transferal to the driven member 114, to enable the extension to stabilize substantially at the applied position of the clutch assembly CA. This relative advancing action combined with the pitch of the threads on the extension acting on the threads in the collar 97 maintains the brakes "on" until pressure on the pedal is increased or diminished. It should, therefore, be appreciated that under such circumstances, very delicate slipping engagement of the apply clutch is required since the thread pitch on the extension would serve to hold the brakes "on" with little if any aid from the apply clutch which virtually "freewheels" until greater or less braking effort is desired.

The foregoing operational description completes two cycles of operation of the present booster mechanism BM which may be termed the "applied stage" and the "holding stage," respectively.

Figure 10:
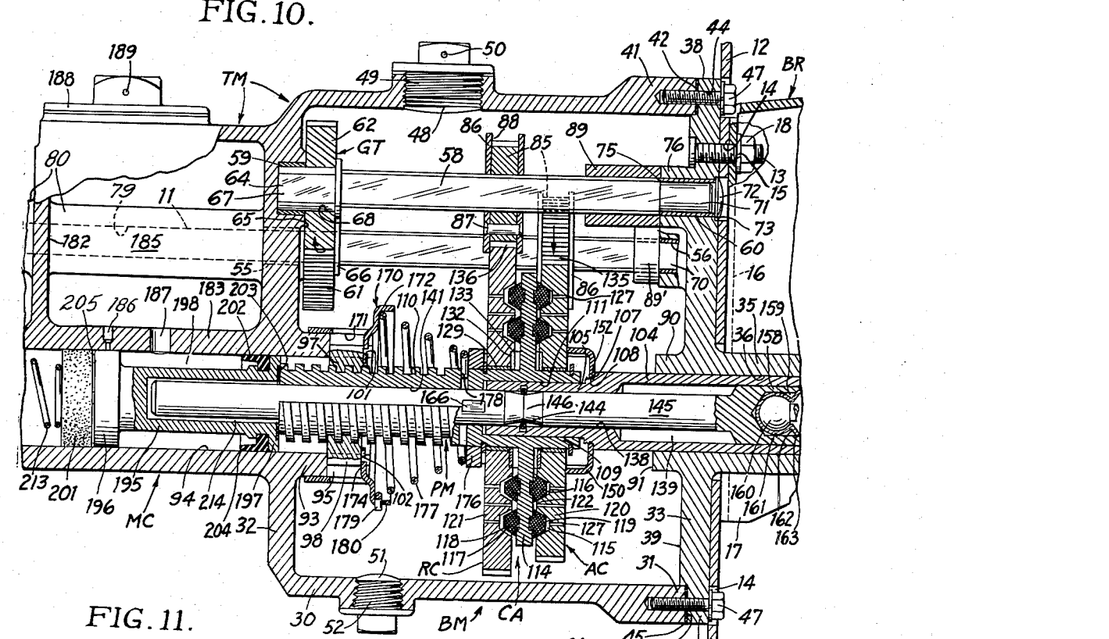
Figure 10 is a longitudinal section on the same scale of Figure 9 showing the parts operated to apply the vehicle brakes.

A third cycle of operation relates to "releasing" the brakes from an applied position. Assuming the vehicle brakes are in applied condition as shown in Figure 10, and it is desired to release them or take them "off," and that the engine E is running. To effect this releasing operation, the driver merely has to remove pressure from the foot pedal 19 which action enables the pedal return spring 25 to withdraw the pedal and connected actuating rod 145, the latter carrying with it the shifting bracket 150 out of engagement with the apply clutch driving member 120 and into engagement with the release clutch driving member 121 and overcome its disengaging spring 133, thus bringing this driving member into slipping engagement with the driven member 114 to cause counterclockwise rotation thereof to unthread the threaded extension 110 away from the collar 97 to retract the clutch assembly CA toward fully released position shown in Figure 2. This unthreading action to establish the booster mechanism BM in released position is supplemented by the rotational and axial biasing action of the driven member return spring 177.

It should be importantly observed that the detent mechanism DC does not necessarily have to release in a brake releasing direction since commercial practice dictates that the pedal return spring 25 would not necessarily have the capacity of breaking such detent connection but must be capable of overcoming the release clutch disengaging spring 133, therefore, spring 25 would serve to prevent a lock-up condition of the release clutch RC as the amount of force that can be exerted on the driving member 121 thereof is determined by the biasing action of the pedal return spring in excess of the opposing action of the disengaging spring 133. However, it should be emphasized that a "lock-up" condition of the release clutch RC does not involve the hazard as would the apply clutch AC. Should the release clutch RC lock-up during releasing of the pressure on the pedal 19 induced by the action of the pedal return spring 25, it would serve to make a more rapid release of the vehicle brakes as against a slipping engagement thereof, but upon the driven member 114 reaching the position of full retraction depicted in Figures 2 and 8, the lock-up condition with driven member would be instantly broken to free these members as shown in these figures since the shifting bracket 150 abuts the end 91 of the hub extension 90 to disable further biasing action thereagainst by the pedal return spring 25. Consequently the torque action on the release clutch driving member automatically separates it from the driven member upon full retraction thereof. Also the spacer sleeve against which the driving gear 85 for the apply clutch driving member is in abutting relation. Thus further movement of the clutch assembly CA rearward is inhibited which causes an automatic separation of the release clutch RC in response to torque input in readiness for another brake-applying cycle as should be apparent.

The same "follow-up" action between the pedal 19 and clutch assembly CA is present in a releasing direction of the vehicle brakes. If the pedal 19 is halted at any brake-releasing point, the release clutch RC will automatically disengage sufficiently to maintain the status quo of the vehicle brakes since halting of removal of pressure from the pedal disables the withdrawing action of the pedal return spring 25. Even though the release clutch RC should completely disengage by action of its spring 133 under such brake holding "on" conditions, the threaded extension 110 would impel the driven member 114 rearward into engagement with the apply clutch driving member 120 to maintain the brakes "on." This holding action is capable of being effected at any point along the full operating movement of the clutch assembly CA from its normally released position portrayed in Figures 2 and 8, but when the shifting bracket 150 comes into engagement with the end of the hub extension 90, operator or spring force is no longer effective on the driving members 120, 121, and as a consequence the torque input automatically forces the clutches AC or RC into disengaged condition as the case may be.

A fourth cycle of operation is demonstrated by Figure 1 wherein the clutch assembly CA is in fully released position corresponding to Figure 2 depiction thereof, and the engine E is not operating thus no drive torque is being produced to operate the torque-actuated device TM. In such case, the driver has applied sufficient pressure to the foot pedal 19 to break the connection DC and thus bring the free end of the actuating rod 145 into engagement with the bottom of the master cylinder piston bore 214 to move it to the brake-applying position desired independently of the clutch assembly CA. Thus the piston 195 may be operated directly by the actuating rod 145 by foot pressure applied to the pedal 19 in a conventional manner and without interference from the clutch assembly CA whether or not the latter is operating from drive from the engine E. This special safety feature is provided by the novel detent connection DC which is operable to release the actuating rod 145 and pedal 19 for conjoint movement to operate the master cylinder piston 195 whether engine operation should cease during a brake-applying operation or not. In the event the brakes have been applied by the clutch assembly CA activated by the engine E, and the engine should stop for any reason, the brakes may be held "on" by merely pressing through on the pedal 19, whereupon the spring 177 imparts rotational and axial action to the clutch driven member 114 to return the clutch assembly CA to released position shown in this figure out of interference with operator actuation of the master cylinder MC to apply and release the brakes solely under his control. The biasing action of spring 177 supplemented by the disengaging action of spring 133 when foot pressure is removed from pedal 19 is of sufficient magnitude as to overcome the frictional "drag" obtaining in the clutch assembly CA to release the driven member 114 for return automatically to position of Figure 2 in the event torque input from the engine E to the clutch assembly CA is interrupted. Thus the unwinding axial thrust of spring 177 quickly restores the clutch assembly CA to its normally released position if torque input is interrupted. This "straight-through" operation of the master cylinder MC is facilitated by removing thrust normally effective between the piston 195 and confronting engaging end of the threaded extension 110 when the clutch assembly is transmitting torque thereagainst to apply or release the brakes.

The hardened thrust ring 203 embedded in the outer end of the hydraulic piston 195 (see Figure 10) reduces friction and wear with respect to the rotating end of the threaded extension 110 when the piston 195 is being actuated thereby to apply and release the vehicle brakes. Upon interruption of drive torque to the torque-actuated device TM, pedal operation becomes immediately effective which if the brakes are being held "on" solely by the pedal, separates the piston 195 from the threaded extension to free the extension for rotation and axial movement toward fully retracted position.

During a brake-releasing operation either jointly or separately by the clutch assembly CA or pedal 19, it should be noted that the master cylinder piston return spring 213 is effective and cooperates with the operating mechanism of the torque-actuated device TM and pedal assembly P to assist in the return of these assemblies to their respective released dispositions. If the pedal 19 is being used to effect a "straight-through" operation of the fluid-displacing parts within the master cylinder MC, or being used jointly with the torque-actuated device TM, this spring cooperates with spring 177, the release clutch RC and pedal return spring 25 to establish the booster mechanism BM in normally released position shown in Figures 1 and 2. Accordingly, my invention contemplates this coaction between a conventional master cylinder assembly as exemplified in the present disclosure as an essential component to make the torque-actuated device TM fully operative to serve the useful purpose set forth herein, and the claims define this necessary coaction.

It is therefore, believed manifest from the foregoing description augmented by the drawing, that my improved torque-responsive booster brake mechanism BM is capable of producing smooth energization of the vehicle brakes in response to reduced pedal effort so that the present apparatus may be commercially employed on vehicles having low-pedal brake control, and that the engaged and disengaged conditions of the clutch assembly CA are sensitively correlated in response to incremental movements of the control pedal 19.

It is contemplated that the ridge-type friction elements on the clutch members may be smooth facings composed of material suitable for operating in a bath of oil to reduce heating and for longer service wear.

A further variation contemplates that the drive line which includes the pair of universal joints UJ may be replaced by a flexible cable drive of well known commercial construction, and that the gear train GT may utilize gears made from fibrous material rather than metallic substance, and that the clutch facing would not work in a lubricant whereby lubrication of the working parts of the torque-actuated device TM would be limited to an adherent grease between the threads of the collar 97 and threaded extension 110 which lubrication would be sealed in at the time of assembly of the mechanism. Thus, the invention contemplates a gear train and clutch assembly which works in constant bath of oil, or operates dry with the exception of the threaded extension 110.

In the applying cycle of the booster mechanism BM, the thrust-transmitting capacity of the detent connection DC before disconnecting must be capable of activating the apply clutch AC against its disengaging spring 133 to a slipping torque transferal condition, while the releasing cycle of said mechanism requires that the pedal return spring 25 be sufficiently tensioned to overcome the release clutch disengaging spring 133 to bring about slipping engagement thereof to retract the operating parts of the booster mechanism BM to released brake "off" position shown in Figure 2. Thus, whether the apply or release clutch is activated, the wave-type disengaging springs 133 serve the important function of establishing the said clutches in disengaged condition upon removal of foot pressure from the pedal 19, and at the same time the disengaging spring for clutch AC serves in conjunction with the pedal return spring 25 as a "reaction means" on the pedal to provide the driver with an awareness of the degree of slipping clutch engagement effective so that the engaging action of said clutches may be controllably regulated to produce smooth "on" and "off" brake operations.

The apply clutch driving member is shown driven at a faster rate of speed than the release clutch driving member, however these two clutches may operate at the same speeds with equal efficiency or the release clutch operated faster than the apply clutch. These optional driving conditions are readily obtained by modifying the gear train GT ratios to provide such relative speeds of the said clutches. In the present embodiment, the release clutch is shown driven at a slower rate than the apply clutch since the rotational-axial reaction of the spring 177 on the driven member 114 aids in accelerating movement of the releasing operation. A further optional feature is obviously available by substituting elongated pinions for the square shaft portions and their slidably mounted gears 85 whereby the gear teeth on the peripheries of the clutch driving members would constantly engage these pinions directly and have relative sliding movement with respect thereto along the full axial travel of the clutch assembly CA.

The fragmentary portion of the engine E is illustrated by way of example as a source of drive torque production, but the invention contemplates that this source may be independent of said engine by utilizing an electric motor to rotate the input shaft 11 or other types of motors energized by hydraulic or pressure differential forces.

Reference is now made to the terminology used in the foregoing description and in the appended claims in which the identifying expressions and/or terms employed are intended to convey meanings which include the range of reasonable equivalents in the patent sense. For example, the expressions, "torque-actuated device"; "friction clutch"; "friction drive"; "torque-responsive mechanism"; "clutch assembly"; "transmission"; "two-directional drive"; "drive"; "torque-drive"; "booster brake mechanism"; "torque-transmitting means"; "pressure-producing means"; etc., are intended to include any casing and/or chamber having a two-directional rotating assembly activatable to transmit and interrupt torque transmission therethrough whether such assembly includes a gear train and/or clutch assembly or some other means serving the same purpose. The terms, "forward," "vertical," "rear," "rearward," "bottom," "top," "horizontal," "front," and other directional words and characters are intended to have only relative connotation for convenience in describing the construction and operation of the structure as illustrated in the drawing, and are not intended to be interpreted as requiring any particular orientation with respect to associated structure external to the present disclosure or the operating position thereof.

Although a preferred embodiment of my invention has been disclosed herein and which is believed well calculated to fulfill the objects above stated, it will be appreciated that I do not wish such to be limited to the exact construction and/or arrangement of the parts shown, since it is evident that modifications, variations, changes and substitutions may be made therein without departing from the proper scope or fair meaning of the subjoined claims.

Having thus described my invention, I claim:

1. In a torque-actuated booster mechanism having an element movable to perform work, movement of said element being opposed by a normally preloaded spring, the improvement which comprises: a hollow casing closed at one end and open at the other; a detachable cover for closing the open end of said casing; a driven member rotatably supported in the casing between the closed end and cover thereof; an externally threaded hollow extension acted on by said driven member to rotatably and axially move together from a normal fully retracted position in an advancing operating direction to move said work performing element; a complemental internally threaded collar fixed on said casing in threaded engagement with said extension, said collar being effective to impart relative axial movement to the extension to actuate said work performing element as a function of corotational movement of said driven member and said extension; spring means including a compression spring encircling said extension, said spring having one end anchored to the casing and the other end reacting on the extension to impart rotational and axial movements to said extension and the driven member to retract them; a pair of oppositely rotatable drive shafts journaled between the closed end and cover of said casing in parallel relationship; a pair of constantly meshing gears for transmitting drive from one shaft to the other in opposite directions; another pair of gears slidably mounted on said shafts and corotational therewith; a pair of oppositely rotatable longitudinally spaced driving members coaxially journaled on said driven member with the latter member disposed in the space therebetween in normally disengaged relation with respect to said driving members, said driving members being selectively engageable in frictionally slipping relation with respect to said driven member to advance and retract the same; biasing means for urging said driving members to disengage with respect to the driven member; gear teeth defining the periphery of each driving member, and which are in constant meshing relation with respect to said pair of slidable gears; flange means carried by the sliding gears for connecting their respective driving members to move axially together; shifting mechanism for imparting sliding movement to said driving members and connected slidable gears relative to each other and to the driven member to selectively engage and disengage them from said driven member whereby the threaded extension is threaded into said collar and withdrawn therefrom to provide reciprocal movement to said extension as a function of its rotation; a cylindrical element coextensive with said extension in the hollow thereof and the driven and driving members; a yieldable detent mechanism carried by said driven member for releasably connecting the said element and shifting mechanism; operator-operated means including a link for acting on said element to shift the shifting mechanism thereby engaging and disengaging said driving members from the driven member; and a source of drive torque for imparting rotational movement to one of said drive shafts.

2. A torque-actuated booster mechanism according to claim 1 in which the frictionally engaging surfaces on the driven and driving members are rotatable in a bath of lubricant and comprise a plurality of concentrically disposed circular ridges which in cross-section have tapered complemental faces frictionally engageable in slipping relation to rotate the driven member; and concavities disposed between a pair of ridges and the engaging ridge are vented to atmosphere to prevent fluid lock therebetween which would inhibit slipping engagement therebetween.

3. A torque-actuated booster mechanism according to claim 1 in which said spring means comprise a cup-shaped seat member detachable fixed on the casing; a compression spring of conical configuration with the larger end anchored to said fixed seat member and the opposite smaller end anchored to the said threaded extension whereby rotational-axial movement of said extension in an operating direction to move said work performing element energizes said spring to subsequently impart said rotational-axial movement to said extension toward released position.

4. A torque-actuated booster mechanism according to claim 3 in which engagement of the driving member with the driven member to release the extension is supplemented by the rotational-axial action of said spring, to effect released position of said extension.

5. A torque-actuated booster mechanism according to claim 1 in which the yieldable detent mechanism comprise: a sleeve operably associated with said shifting mechanism; an internal annular groove in said sleeve; a V-shaped groove externally formed on said operator-operated element; and a split resilient metallic ring carried in said internal groove for releasably connecting the operator element to said sleeve whereby reciprocable movement is imparted from the operator element to said sleeve to shift said shifting mechanism according to the locking effect provided by said ring and V-shaped groove connection, said ring enabling release of the operator element with respect to said sleeve upon sufficient thrust being applied to said element thereby disengaging said element from the shifting mechanism to engage the work performing element to move the same independently of said driven and driving members, by operator force alone.

6. A torque-actuated booster mechanism according to claim 1 in which the operator-operated means additionally include a pedal acting directly on said link, a normally pretensioned spring reacting on the pedal whereby depressing and releasing movements of the pedal or transmitting correspondingly to said operator element to reciprocate the same, said releasing movements being effected jointly by said last-named spring, said work performing element return spring, and the spring means acting on said threaded extension, the pedal spring effecting slipping engagement of the release driving member to rotate the driven member in a releasing direction.

7. A torque-actuated brake booster mechanism having an element movable to perform work, movement of said element being opposed by a normally preloaded spring, the improvement which comprises: a hollow casing open at one end and closed at the other; a detachable cover for closing the open end of the casing; clutch means including a driven member and a pair of oppositely drivable driving members for selectively engaging the driven member to drive the latter in corresponding relative opposite directions between normally released and operating positions; an externally threaded hollow extension rotatably and axially impelled by said driven member to move said work performing element; a complemental internally threaded member fixed on the casing for threaded engagement by said extension to actuate the latter in response to driving the driven member in opposite directions, said extension projecting through said fixed member into engagement with said work performing element to correspondingly actuate the same; spring means including a compression spring encircling said extension and having one of its ends anchored to the casing and the other end reacting on the extension to impart axial and rotational movements thereto to release the same; a pair of oppositely rotatable drive shafts journaled between the closed end and cover of said casing in parallel relationship; a pair of constantly meshing gears fixed on said shafts for transmitting drive therebetween in opposite directions; a pair of gears slidably disposed in longitudinal spaced relation on said shafts; gear teeth defining the periphery of said pair of driving members for constant meshing relation with said slidable gears; means carried by said slidable gears for preventing demeshing of said slidable gears with respect to their driving members whereby the latter is movable axially in unison with its respective slidable gear; biasing means carried by said driven member for urging the driving members into disengaged relation with respect to the driven member in released position; shifting mechanism for imparting sliding movement to said driving member and meshed slidable gears relative to each other and to the driven member to selectively effect slipping engagement and to fully disengage them from said driven member whereby the threaded extension is threaded into said complemental fixed member and withdrawn relatively thereto to effect reciprocable movement of the extension; a cylindrical element coextensive with said extension in the hollow thereof and the clutch means; yieldable detent means operably incorporated between the element aforesaid and shifting mechanism for controlling the latter; operator-operated means including a link acted on by the operator for controlling the said element; and a source of drive torque for imparting drive to one of said drive shafts.

8. In vehicle brake operating mechanism having an element movable to perform work and a normally preloaded compression spring opposing movement of the said element, the improvement which comprises: a two-directional friction drive including a housing therefor; a pair of threadedly engaging elements, one of said elements being fixed on the housing and the other element being movable relatively, rotationally and axially thereto in engaging relation with said work performing element to move the same in response to progressive threading engagement of said pair of elements under influence of said drive; spring means including a compression spring having one end anchored to said housing and the other end reacting on the movable threaded element to impart rotational and axial movement to separate said pair of elements; drive mechanism operably incorporated in said drive to produce thrust in two directions; biasing means operably incorporated in said drive mechanism to assist in establishing a non-driving condition therein; a reciprocable element coaxially disposed with respect to the drive and other threaded element; releasable detent means including a yieldable element operably incorporated between said reciprocable element and drive mechanism for controlling said drive and releasable to enable said reciprocable element to act directly on said work performing element independently of said drive; an operator-operated member for reciprocating said reciprocable element; and a source of drive torque for driving said drive mechanism.

9. A power transmission in which physical operating force is supplemented by torque-drive assistance, the improvement which comprises: an oppositely drivable friction mechanism; means for driving said mechanism in opposite directions; a thrust member acted on by said mechanism to effect axial movements as a function of rotational movements thereof in an operating direction; energizable yieldable means for converting rotational movements into axial movements of said thrust member in a releasing direction; biasing means for cooperating with said yieldable means in a releasing direction to establish said mechanism in non-driving condition; a reciprocable element coaxially disposed with respect to said thrust member; releasable connecting means operably incorporated between said mechanism and reciprocable element for controlling the direction of drive of said drivable mechanism; an operator-operated member for controlling said reciprocable element; and a source of drive torque for imparting drive to said driving means.

10. A power transmission according to claim 9 in which the relative speeds at which the mechanism is driven are at different speed ratios whereby one of the drives operates at a given speed ratio and the other drive operates at a greater or lesser speed ratio to provide different rates of effecting said operating and release positions of said mechanism.

11. A brake booster mechanism including a spring-loaded element movable to perform work, the improvement which comprises: a friction transmission device having a pair of rotatable driving members selectively engageable with a common rotatable driven member to impart two-directional rotation thereto; a hollow element reciprocated by said driven member to act correspondingly on said work performing element in opposition to its spring load; an element coaxially disposed with respect to said reciprocated element for acting directly on said work performing element in opposition to its spring load; personally-operated means for controlling said coaxial element; a releasable connection operably incorporated between said personally-operated means and said coaxial element for disconnecting the personally-operated means therefrom; means controlled by said personally-operated means for selectively engaging said driving members with said driven member while the releasable connection is effective; spring means for imparting axial and torsional movements to said driven member to release it from the engaged driving member; and means for driving said driving members.

12. In vehicle brake actuating mechanism including a power takeoff having an output shaft and an operator operated member having a normally released position, the improvement which comprises: an actuator for actuating said brake actuating mechanism; a two-directional drive including a pair of friction clutches for actuating said actuator to apply and release the vehicle brakes in response to selective slipping engagement of said clutches; a power gear train connected to said output shaft for driving said drive clutches in opposite directions; spring means for disengaging said clutches; actuating means including an element movable in response to operating said operator member from released position in an operating direction, for engaging one of said clutches to apply the brakes; means limiting the amount of pressure which the operator can exert on said one clutch via said actuating means to maintain slipping engagement of said one clutch; and a source of drive torque connected to said power takeof.

13. A brake actuating mechanism according to claim 12 in which said pair of friction clutches comprise: a driving apply member and a driving release member driven by said gear train and a common driven member selectively engaged thereby for actuating said actuator.

14. A brake actuating mechanism according to claim 12 in which said actuating means comprise: a pair of telescopically-related elements for selectively engaging said clutches which respond to movement of said movable element under influence of said operator-operated member.

15. A brake actuating mechanism according to claim 14 in which said limiting means comprise: a releasable element operably incorporated between said movable element and one of said telescopic elements whereby a predetermined pressure on said movable element is effective to actuate said releasable element to enable relative movement between said movable and telescopic elements.

16. In a power transmission having a housing provided with three relatively rotatable shafts disposed in parallelly spaced relation: a continuously meshed gear train interconnecting two of said shafts to rotate the same in opposite directions; a pair of slidable gears mounted respectively in longitudinally spaced relation on said shafts and co-rotatable therewith; a frictional member co-rotatable with said third shaft; a pair of circular frictional members, one on each side of said first-named member, and adapted for selective engagement therewith to rotate the same in opposite directions; gear teeth defining the peripheral marginal portion of each of the said pair of members and adapted to continuously mesh with said slidable gears respectively to rotate said pair of members in opposite directions; means interconnecting said slidable gears and pair of members to slide axially together; spring means incorporated between the first-named member and the said pair of members to effect disengagement thereof; and personally-operable shifting means including an actuatable element to selectively engage said pair of members with said first-named member in opposition to said spring means.

17. A power transmission constructed in accordance with claim 16 including automatically releasable means operable in response to said personally-operable shifting means to disconnect said actuatable element from said shifting means and thereby disengage the engaged one of the said pair of members at substantially any operated position of said shifting means.

18. A power transmission constructed in accordance with claim 16 wherein one of the two shafts is an input shaft, and the third shaft is an output shaft.

19. A power transmission constructed in accordance with claim 16 wherein one of the two shafts is an output shaft, and the third shaft is an input shaft.

References Cited in the file of this patent

UNITED STATES PATENTS

| Re. 22,965 | Gates | Jan. 20, 1948 |
| 1,855,504 | White | Apr. 26, 1932 |
| 2,090,335 | Russell | Aug. 17, 1937 |
| 2,097,873 | Evans | Nov. 2, 1937 |
| 2,145,373 | Saives | Jan. 31, 1939 |
| 2,225,886 | Potter | Dec. 24, 1940 |
| 2,236,415 | Russell | Mar. 25, 1941 |
| 2,258,855 | La Brie | Oct. 14, 1941 |
| 2,322,133 | Hettelsater | June 15, 1943 |
| 2,553,826 | Martin | May 22, 1951 |
| 2,561,826 | Skillman | July 24, 1951 |
| 2,598,564 | Kucera | May 27, 1952 |
| 2,925,805 | Schultz | Feb. 23, 1960 |

FOREIGN PATENTS

| 114,222 | Switzerland | Mar. 16, 1926 |
| 179,329 | Germany | Dec. 12, 1906 |
| 204,512 | Great Britain | Nov. 16, 1923 |

UNITED STATES PATENT OFFICE
CERTIFICATE OF CORRECTION

Patent No. 2,968,962                                                          January 24, 1961

Glenn T. Randol

It is hereby certified that error appears in the above numbered patent requiring correction and that the said Letters Patent should read as corrected below.

Column 1, line 46, for "dicated" read -- dictated --; column 2, line 25, for "of" read -- or --; column 4, line 54, for "attached" read -- attach --; line 56, for "opopsite" read -- opposite --; column 5, line 1, strike out "detachably"; line 2, before "cover" insert -- detachable --; column 7, line 46, after "with" insert -- a --; column 9, line 36, strike out "are"; column 11, line 38, for "carry" read -- carries --; line 39, for "walls" read -- wall --; column 14, line 5, for "147" read -- 148 --; column 19, line 34, for "detachable" read -- detachably --; lines 38 and 41, for "movement" read -- movements --; column 20, line 70, for "movement" read -- movements --.

Signed and sealed this 15th day of May 1962.

(SEAL)
Attest:

ERNEST W. SWIDER                                             DAVID L. LADD
Attesting Officer                                               Commissioner of Patents